United States Patent [19]
Schoenzeit et al.

[11] Patent Number: 5,619,624
[45] Date of Patent: Apr. 8, 1997

[54] APPARATUS FOR SELECTING A RASTERIZER PROCESSING ORDER FOR A PLURALITY OF GRAPHIC IMAGE FILES

[75] Inventors: Loren Schoenzeit, Orono; Philip Lodwick, Richfield; Richard A. Keeney, Eagan; William H. Glass, Edina, all of Minn.

[73] Assignee: Management Graphics, Inc., Minneapolis, Minn.

[21] Appl. No.: 246,795

[22] Filed: May 20, 1994

[51] Int. Cl.⁶ ................................................. G06T 11/00
[52] U.S. Cl. ........................ 395/118; 395/501; 395/502
[58] Field of Search .................................... 395/153, 162, 395/163, 100, 164, 115, 116, 118; 345/121–126

[56] References Cited

U.S. PATENT DOCUMENTS

| | | | |
|---|---|---|---|
| 4,862,155 | 8/1989 | Dalrymple et al. | 395/135 |
| 4,949,280 | 8/1990 | Littlefield | 395/163 |
| 5,010,515 | 4/1991 | Torbory, Jr. | 395/163 |
| 5,113,493 | 5/1992 | Crosby | 395/152 |
| 5,179,637 | 1/1993 | Nardozzi | 395/114 |
| 5,220,650 | 6/1993 | Barkans | 395/163 |
| 5,261,047 | 11/1993 | Rlushin | 395/162 |
| 5,274,760 | 12/1993 | Schneider | 395/162 |
| 5,315,700 | 5/1994 | Johnston et al. | 395/163 |
| 5,349,647 | 9/1994 | Freiburg et al. | 395/115 |
| 5,388,206 | 2/1995 | Poulton et al. | 395/163 |
| 5,392,392 | 2/1995 | Fischer et al. | 395/162 |
| 5,434,967 | 7/1995 | Tannenbaum et al. | 395/163 |
| 5,473,750 | 12/1995 | Hattori | 395/163 |
| 5,509,115 | 4/1996 | Butterfield et al. | 395/147 |

*Primary Examiner*—Heather R. Herndon
*Assistant Examiner*—Stephen Hong
*Attorney, Agent, or Firm*—Barry R. Lipsitz; Ralph F. Hoppin

[57] ABSTRACT

Apparatus is provided for managing a plurality of output devices to generate images from graphic image files. Each of the output devices is associated with a respective control system which includes a first queue for storing the graphic image files. The graphic image files are rasterized to develop raster image data that is stored in a second queue. A job controller selects images represented by data in the graphic image files stored in the first queue for rasterizing on a real time basis. The job controller is responsive to parameters of the graphic image files, the second queue, and the associated output device to manage the flow of image data from the first queue to a raster image processor (RIP) and from the RIP to the output device via said second queue.

27 Claims, 6 Drawing Sheets

APPARATUS FOR SELECTING A RASTERIZER PROCESSING ORDER FOR A PLURALITY OF GRAPHIC IMAGE FILES

BACKGROUND OF THE INVENTION

The present invention relates to the rasterization of graphic image files, and more particularly to apparatus for managing the raster image processing of graphic images using a plurality of queues to make efficient use of computer system resources.

In computer generated image recording, a plurality of computer generated images are rasterized for use in exposing corresponding frames of photographic film or the like. The film (or other imaging medium) can then be developed to provide, e.g., color slides or motion picture footage. Laser printers and color or monochrome copiers can also be used to record rasterized computer generated images.

To obtain the computer generated images, a user first generates a graphic image file using a computer graphics program. The graphic image file may include one or more images or frames of image data which, for example, are in a bit mapped or text (e.g., ASCII) format. The image data are processed by a raster image processor (RIP) which provides frames of raster image data for use by an output device in generating images. The output device may comprise a graphic display monitor and/or a photographic film recorder. Film recorders, such as those sold under the Solitaire® and Sapphire® trademarks by Management Graphics, Inc. of Minneapolis, Minn., USA are well known in the art. Laser printers and copiers are also commonly available output devices.

In the past, during use of such an image generation and recording system, the RIP would send one page of image data at a time to an output device that would then generate the image. This resulted in inefficient use of the output device, as the processing time associated with generating an image by the output device remained relatively constant while the time required to produce a page of raster image data varied with the complexity of the image. It would not be unusual for the output device to spend considerable time in an idle mode at times when complex images were being processed by the RIP. At other times, the RIP would be idle because the output device was already busy. There was no way to minimize the idle periods and keep both the RIP and output devices as busy as possible.

In computer systems accessed by local and wide area networks, a plurality of users may compete for the use of a graphic output device. Because of the excessive processing time required to generate raster image data, inefficient use of the output devices available via the network can result in an unacceptable response time for one or more of the various users. Further, to process different graphic image files for different output devices and end user requirements, a plurality of different RIP modules may be needed for generating raster image data. Examples of different available RIP modules include those known as "PostScript," "Targa," and "TIFF."

It would be advantageous to provide a system for managing the processing of graphic image data by different RIPs and different output devices. Such a system should minimize the amount of time that the RIPs and output devices are idle, and keep these devices as busy as possible. Such a system should also enable different graphic image files to be processed by the same or different RIPs and routed to the same or different output devices in an orderly and efficient manner. It would be further advantageous to provide such a system in which multiple instances of the same RIP, implemented by a RIP software module, could be run in parallel to concurrently process different graphic image files for the same or different output devices.

The present invention provides a system for managing the processing of graphic image files having the aforementioned and other advantages.

SUMMARY OF THE INVENTION

In accordance with the present invention, apparatus is provided for managing a plurality of output devices to generate images from graphic image files. The apparatus may be associated with a host system. Each of the output devices is associated with a respective control system. The control systems each comprise a first queue for storing graphic image files to be processed by (e.g., imaged on) the associated output device. Means are provided for rasterizing image data from the graphic image files stored in the first queue to provide raster image data for a plurality of images. A second queue is associated with each control system for storing raster image data generated by the rasterizing means. Graphic image files stored in the first queue are selected on a real-time basis for processing by the rasterizing means. To accomplish this, the selecting means are responsive to parameters of the graphic image files and the associated output device to manage the flow of image data from the first queue to the rasterizing means, and then from the rasterizing means to the output device via the second queue. The selecting means may also be responsive to parameters of the second queue, the host system, and/or user input.

The graphic image files stored in the first queue will contain data for different images in a first order. The data defining each image have an associated volume. In an illustrated embodiment, the selecting means optimize the storing of the raster image data in the second queue by selecting image data from the first queue for processing by the rasterizing means in a second order based on the associated volumes. Since the data for each image will have a different volume before and after rasterizing, the selecting means may base its selection either on the volume of data before rasterizing or on an estimate of the volume of data that will exist after rasterizing. Where an accurate estimate can be made, it will be more efficient to base the selection on this estimate than on the pre-rasterized data volume.

Parameters of the second queue to which the selecting means are responsive can indicate, for example, how much storage space is available in the second queue to receive raster image data. Additionally, such parameters of the second queue may indicate the number of images that are currently stored in the second queue for transfer to its associated output device. An example of a host system parameter that the selecting means may consider is an indication of the current availability of at least one host system resource that is required to support the operation of the control system.

Transfer control means can be provided for transferring rasterized image data received from the second queue of a first control system associated with a first output device, to the second queue of a second control system associated with a second output device. In this manner, rasterized image data processed for a first output device (e.g., an image recorder) can be transferred to a second output device (e.g., a display monitor for previewing the rasterized image) without any need to rasterize the original graphic image file twice. The transfer control means may be responsive to input from a user for transferring rasterized image data from the control system for the first output device to the control system for the second output device.

Means are also provided to enable the rasterizing means to select one of a plurality of different raster image processor modules. In this way, the control systems can each access the same or different ones of said RIP modules concurrently. In an illustrated embodiment, the plurality of RIP modules include at least one of a TIFF, Targa or PostScript raster image processor. The graphic image files to be processed will include parameters specifying the RIP module(s) to be used to process the image data contained therein.

At least one of the output devices can comprise a photographic film recorder. Parameters provided by the film recorder can designate film type, a film status, and/or an installed camera module identification. The graphic image files may be either bitmap files or text files. Other output devices can include graphic display monitors and various different image recorders.

A method is provided for managing each of a plurality of different output devices to generate selected images from graphic image files served from a host system. Graphic image files to be processed by an output device are stored in a first queue associated with that output device. Image data from the graphic image files stored in the first queue are rasterized to provide raster image data for a plurality of images. The raster image data generated during said rasterizing step are stored in a second queue associated with the output device. Graphic image files stored in said first queue are selected on a real-time basis for rasterizing. The selecting step is performed in response to parameters of the graphic image files, the associated output device and available computer resources to manage the flow of image data from the first queue to the output device via the second queue.

Apparatus for managing a plurality of output devices to concurrently process a plurality of different images contained in a graphic image file is also provided. Means responsive to parameters of the graphic image file select different image data from the graphic image file for processing by different ones of the output devices. The image data selected for each output device are stored in a first queue associated with that output device. Means are provided for rasterizing the image data from the first queue for each output device to provide raster image data for the output device in response to at least one parameter of that output device. The raster image data for each output device are stored in a second queue associated with that output device. The stored raster image data are then transferred to the associated output device for the generation of an image.

The graphic image files can be served by a host system, and the selecting and rasterizing means can be responsive to the host system or a local workstation for selecting and rasterizing the image data. For example, the host system or a local workstation might specify which users are authorized to send files to a particular output device, or provide information as to the status of various devices connected to the network. The selecting means can also be responsive to parameters of the second queues associated with the output devices for selecting the image data.

The parameters of a graphic image file to which the selecting means are responsive can be indicative of the amount of data associated with different images represented by the graphic image file either before or after rasterizing. Parameters of the second queues to which the selecting means are responsive can be indicative of the amount of space available in the second queues for storing rasterized image data.

DETAILED DESCRIPTION OF THE INVENTION

Figure 1:
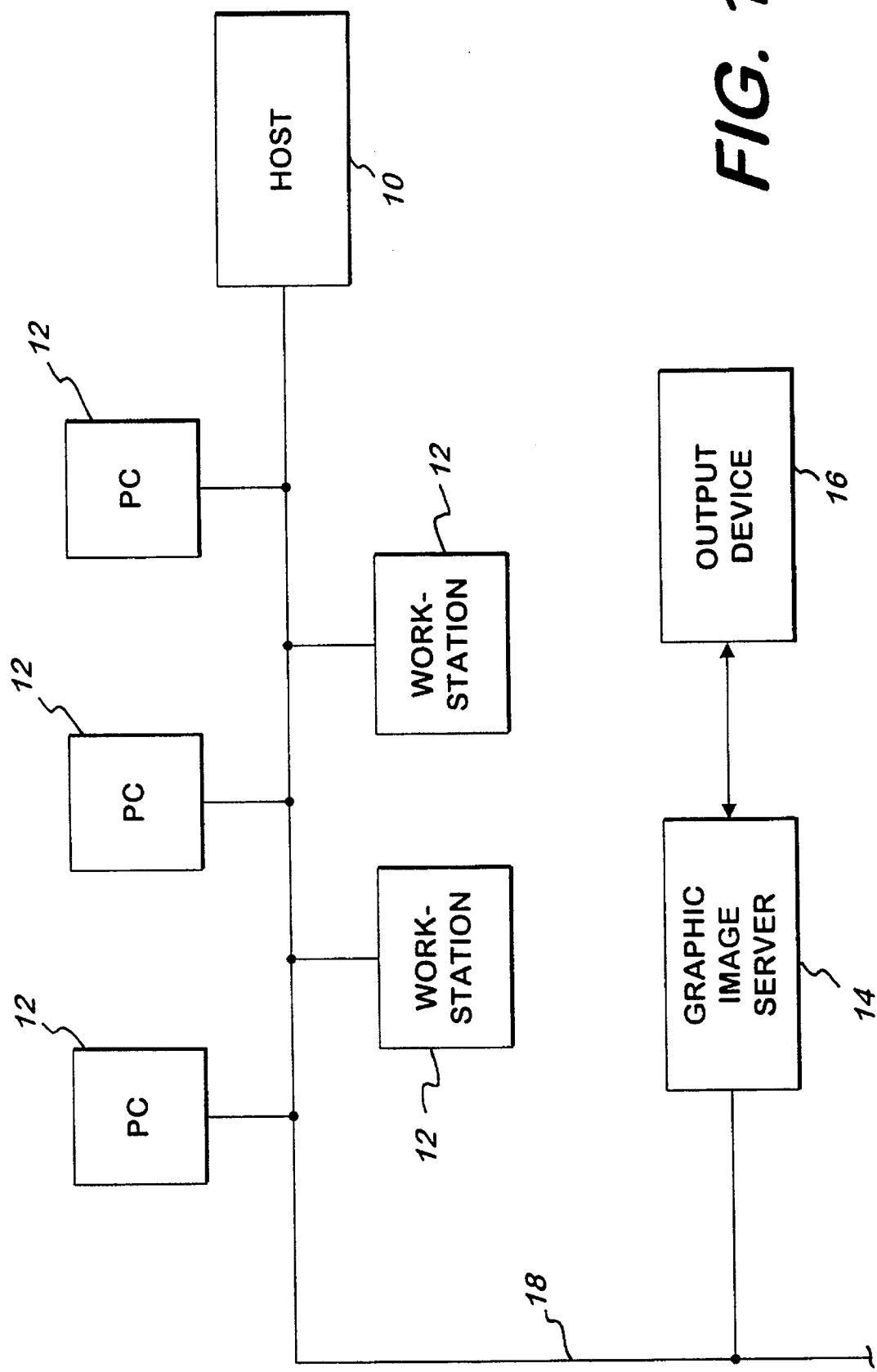
FIG. 1 is a diagrammatic illustration of a network including a host computer, a plurality of workstations, an output controller, and output devices in accordance with the present invention.

FIG. 1 illustrates a computer network configured in accordance with the present invention. The network includes a host computer 10 and a plurality of personal computers (e.g., PC or Macintosh) and/or workstations 12, each of which may communicate with the host computer 10 and with a graphic image server 14 via network path 18. One or more output devices, such as a photographic image recorder 16, are coupled to graphic image server 14 for the generation of color slides or the like. Other types of output devices that can be used in connection with the system of the present invention include display monitors, laser printers, color and monochrome copiers, and non-photographic image recorders.

A user creates a graphic image file that includes one or more graphic images, using a personal computer or workstation 12 that runs commercially available graphics software. The graphic image file in, e.g., text or bitmap format, may then be communicated to the graphic image server 14 via network path 18. It will be appreciated that the graphic image files may, rather than being transferred along network 18, be temporarily stored on a medium such as a diskette and then input to the graphic image server 14 via a floppy disk drive or the like. After receiving the graphic image file, the graphic image server processes the data for each of the individual images contained in the file into raster image data for transfer to the output device 16. The output device then scans the raster image data onto an output medium such as paper or photographic film.

The graphic image files created by different users may be in any of several conventional formats. Examples of such formats are PostScript files, TIFF files and Targa files. PostScript, for example, is a device-independent page description language optimized to render document images on display devices, laser printers, film recorders, fax machines and phototypesetters. In PostScript, a page is represented as a bit map, with one bit per pixel. When an actual page is printed, each pixel corresponding to a "1" bit is printed in black (or a predefined color) and each pixel corresponding to a "0" bit is left blank. PostScript is typically used for line art, with or without photographic images. TIFF files comprise a tagged image file format bitmap and are well suited to photographic images. Targa files are also bit mapped files particularly well suited to photographic imaging.

Figure 2:
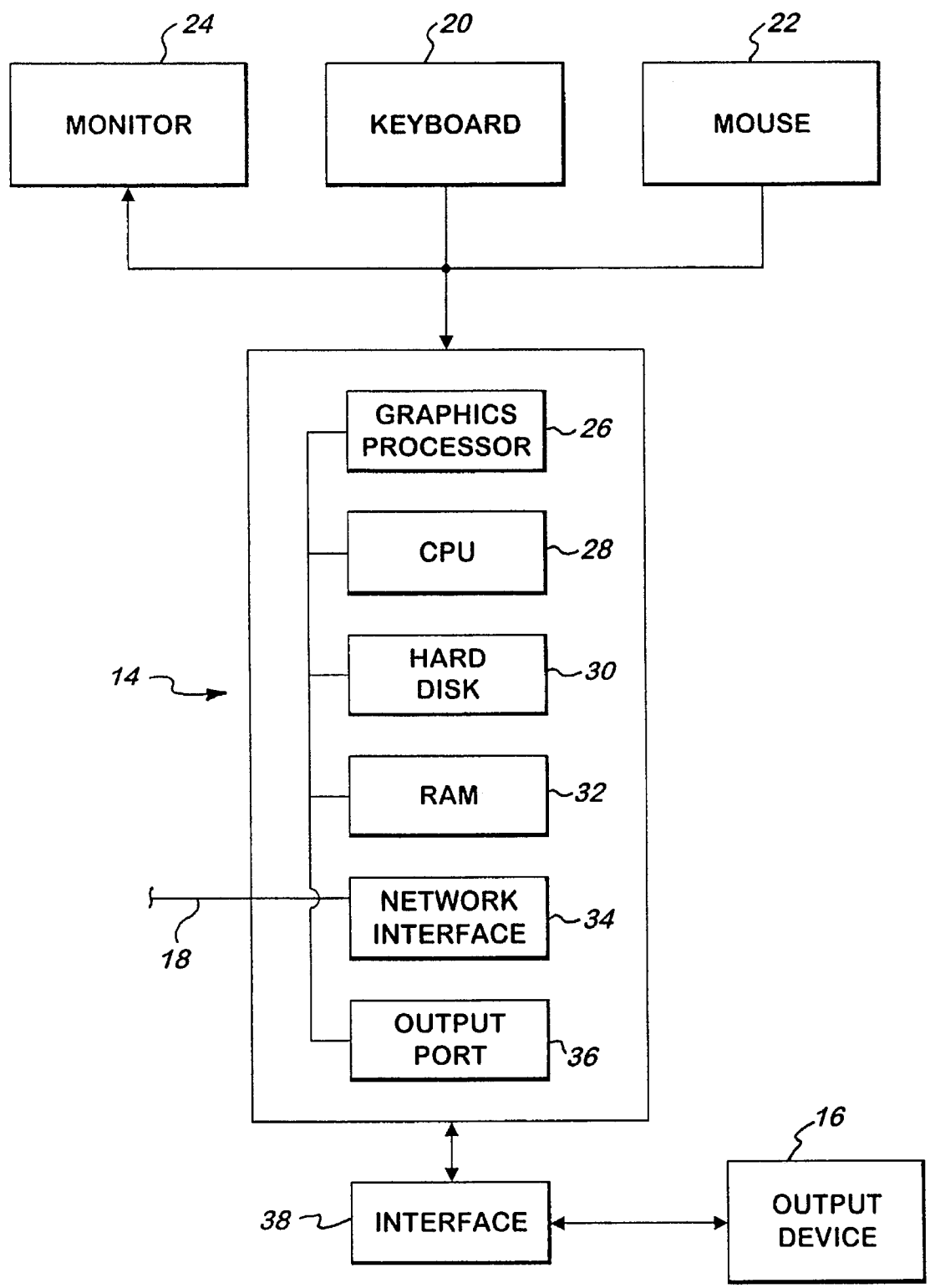
FIG. 2 is a block diagram of a workstation embodying a graphic image server in accordance with the present invention.

FIG. 2 depicts the hardware components of one embodiment of a graphic image server 14 in accordance with the present invention. The image server can be implemented in a graphics workstation, such as one commercially available from Silicon Graphics Incorporated. Well known user interfaces are provided and include a keyboard 20 and a mouse 22. A graphic display monitor 24 is also provided for user interface and can be configured as a separate output device for viewing rasterized images generated by the graphic image server. Graphics capability is provided in the workstation by a graphics processor 26. One or more central processing unit(s) (CPU) 28 provides intelligence for the workstation. Software, including raster image processor software (e.g., PostScript, TIFF and Targa) and "job controller software" in accordance with the present invention is stored e.g., on a hard disk 30 or can be transferred from host computer 10. Random access memory (RAM) 32 is provided for use by the workstation and is also used for various queues in accordance with the invention. A network interface 34, such as a conventional Ethernet interface, allows the workstation to communicate with other components coupled to network path 18. Output port 36, which can be, for example, a standard Centronics parallel port, couples the workstation to output device 16 (e.g., an image recorder, laser printer, or the like) via a conventional interface 38 such as a universal asynchronous receiver transmitter (UART) port or an external small computer standard interface (SCSI).

Figure 3:
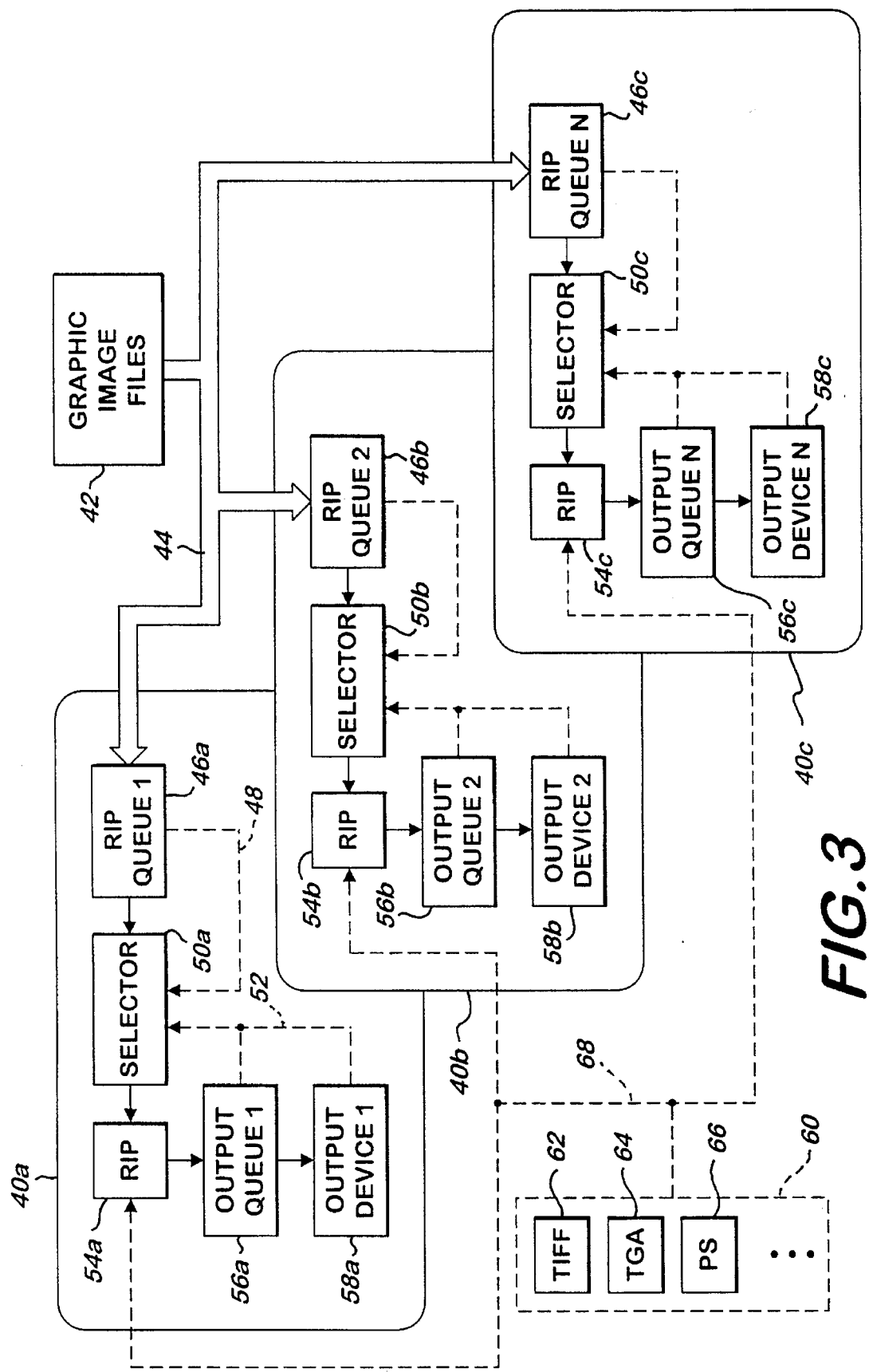
FIG. 3 is a block diagram of apparatus for managing a plurality of output devices in accordance with the present invention.

FIG. 3 is a block diagram illustrating the operation of graphic image server 14 to manage the flow of graphic files and rasterized image data to various output devices in accordance with the present invention. A plurality of output device control modules ("control systems") are shown generally at 40a, 40b, and 40c. These modules can be implemented in software and run on CPU 28 of the graphic image server 14. For purposes of illustration, three output device control modules are shown in FIG. 3, although it will be understood that any number may be employed depending on the number of output devices that the system supports.

Each output device control module is coupled to receive selected graphic image files via data bus 44 from a plurality 42 of such files stored on hard disk 30 of the graphic image server. As indicated above, these files are generated by users and are either downloaded to the graphic image server over the network via network path 18 or transferred via common media, such as a diskette. Each of the output device control modules includes a RIP queue 46a, 46b, or 46c for storing those graphic image files which designate the output device served by the respective output device control module. A RIP 54a, 54b or 54c is provided in each of the modules 40a, 40b, and 40c, respectively, to generate raster image data for the images contained in the graphic image files stored in the associated RIP queues. The RIPs 54 can access, via path 68, any one of a plurality of RIP software modules generally designated 60 (e.g., TIFF module 62, Targa module 64 and PostScript module 66) stored on hard disk 30 or downloaded from the host computer 10. The particular module to be accessed will be designated by the graphic image file being processed. Each RIP communicates with an output queue 56a, 56b, or 56c which, in turn, provides the raster image data to its associated output device 58a, 58b, or 58c. The output devices 58 may be any combination of image recorders, laser printers, display monitors, and the like as described above.

Each file contained in the RIP queues 46 and output queues 56 may include an associated status identification. For example, a job may be "processing", "blocked" or "pending". A blank status may also be included to signify that the file is ready to be run once it is selected. If the file is "processing," it is either in the process of being rasterized by the associated RIP 54 or is being converted into a final output by the associated output device 58. If it is "blocked," it has been placed on hold by a user for subsequent processing. If there is a mismatch between the file and the output device required to generate images from the file, then the "pending" status will be invoked to enable a user to modify the output device as necessary (e.g., change a camera module) before processing is resumed.

In accordance with an important feature of the present invention, each of the output device control modules 40 is provided with a selection function 50a, 50b, or 50c to control and manage the transfer of image data from the associated RIP queue 46 to the associated RIP 54 for rasterizing. To achieve this, the selectors 50 each receive input parameters, represented by dashed lines 48 and 52, from the graphic image files stored in RIP queues 46 and from the output queues 56 and output devices 58, respectively.

In one embodiment, the parameters from the graphic image files include the volume of image data associated with each image contained the graphic image file prior to rasterizing. The volume of image data associated with a particular image will vary depending upon the complexity and size of the image. The amount of computer resources required to rasterize an image will generally be dependent on the volume of image data for that image, with more resources being required for a larger volume of data. The volume parameter allows the selectors 50 to select particular images for processing on a real time basis, based on the amount of computer resources that will be required to rasterize the image.

In a preferred embodiment, the parameters from the graphic image files will include an estimate of the volume of rasterized image data that will result when the graphic image file is rasterized. Using the size of the raster image file (instead of the volume of the graphic image file prior to rasterization) in order to select files for the RIP enables more efficient control of the information flow from the RIP queue through the RIP to the output queue and the output device.

For bit mapped graphic image files (such as TIFF and Targa files), an estimate of the final raster image file size can be provided by simply multiplying the number of pixels across the width of the image by the number of pixels across the height of the image by the pixel depth. The pixel depth depends on whether the image is in color and if so, whether red-green-blue (RGB) or cyan-yellow-magenta-black (CYMK) color processing is used. For monochrome images, the pixel depth is one. For RGB color, the pixel depth is three (i.e., one pixel for each of the three colors). For CYMK color, the pixel depth is four. It will be understood that each pixel can be any number of bits.

The prediction of the raster image file volume that will be generated from PostScript data is more complicated. In order to obtain a worst case volume estimate for use in the real time management of PostScript graphic image files in accordance with the present invention, the graphic image server can keep track of the most complicated scan line for the graphic image file and then base its estimate on the assumption that all of the scan lines will generate as much rasterized data as the most complicated scan line. To compute the worst case raster image file volume, the number of bytes necessary to define the most complicated scan line for the image is then multiplied by the number of scan lines necessary for all color passes involved in generating the completed image.

The parameters provided to the selectors 50 from the output queues 56 enable the selectors to efficiently use the output queues to maintain the output devices in substantially constant operation during the processing of a multi-image graphic image file. One way to accomplish this is to maintain rasterized data for a predetermined number of images in the output queue at all times. A more efficient way to achieve this result is to compare the estimated volume of raster image data for each image to a remaining volume in the output queue, and determine which graphic image data to send to the RIP in order to keep the output queue most nearly filled to capacity.

The parameters provided to the selectors 50 from the output devices 58 comprise information about the status of the output device. For example, where the output device is a film recorder the parameters can specify the type of film currently loaded, the type of camera module in use, and whether the camera is on line. Thus, the selectors 50 monitor the output devices 58 to determine whether the equipment matches the requirements of a particular graphic image file waiting to be processed.

It should be appreciated that each of the output device control modules 40a, 40b and 40c can run concurrently to process different graphic image files destined for different output devices. The control modules can all run the same or different RIP modules at any given time, depending on the needs of the graphic image files being processed. The provision of the graphic image server 14 with a plurality of control modules facilitates the efficient use of the various PCs and workstations coupled to the network. For example, as soon as a user has completed a graphic image file, the file can be transferred to the graphic image server for storage and subsequent processing on an orderly basis. The user's personal computer or workstation will be immediately available for other tasks. The intelligent selection of image data from the RIP queues 46 and the control of the output queues within each control module 40 in response to real time operating parameters enables the use of each output device to be maximized, so that the output devices will not have to wait for a next image file to be rasterized. Instead, a more or less constant flow of raster image data will be passed to each output device from its respective output queue. In this manner, large amounts of graphic image data from a substantial population of users connected to the network can be processed in a logical and timely manner.

It is also possible to provide a plurality of RIPs in each control module, so that a job for a given output device can be processed in parallel. Each RIP can be the same, and each can process a different image (e.g., page) of a multiple image file concurrently with the other RIPs. The RIPs will then output the raster image data to the output queue for selection and processing of the various images by the output device in a proper page order.

Figure 4:
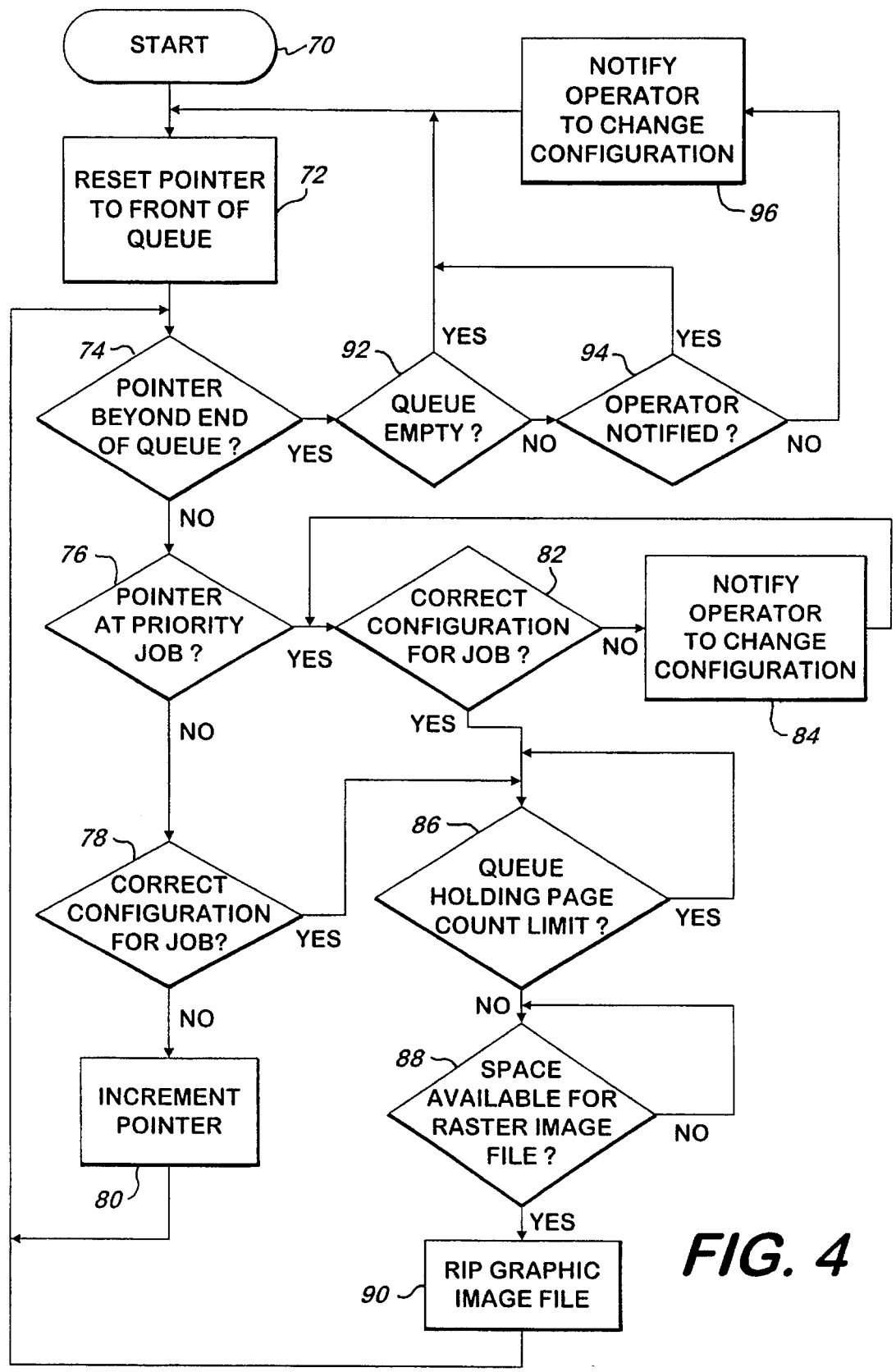
FIG. 4 is a flowchart illustrating the operation of an image data selector in accordance with the present invention.

One possible routine for the selection of graphic image files by selectors 50 from the RIP queues 46 is illustrated by the flowchart of FIG. 4. The routine starts at box 70, and at box 72 a pointer is reset to the front of the RIP queue 46. At box 74, a determination is made as to whether the pointer is at the end of the RIP queue. Initially, the pointer will be at the front of the queue and the routine will proceed to box 76 where a determination is made as to whether the pointer is currently pointing to a "priority" job. A priority job is one which is to be processed ahead of all others, regardless of whether the configuration of the output device 58 associated with the selector is currently set up for that file. If a priority file in the RIP queue is the current file pointed to by the pointer, the routine proceeds to box 82 where a determination is made as to whether the configuration of the output device is correct for the job. If not, the system operator is prompted with a message instructing him or her to change the output device configuration (e.g., load a different camera module or different film) as indicated at box 84. Once the correct configuration for the job has been loaded, as determined at box 82, the routine proceeds to box 86 where a determination is made as to whether a "page count limit" indicative of the maximum number of pages allowed to be written into the output queue at a time has been reached. If so, the output queue is considered to be full, based on the worst case (i.e., maximum) amount of data possible when the page count limit has been reached.

If the output queue is considered to be full, the selection routine remains idle until the queue is no longer holding the page count limit, at which time box 86 will determine that the output queue is no longer "full." Then, the routine proceeds to box 88 where a determination is made as to whether space is available for the raster image file of the current job. If not, the routine again idles until there is enough space available in the output queue for a raster image file to be generated from the current job. Then, the graphic image file for the current job is rasterized as indicated at box 90. The routine then proceeds back to box 74. In this manner, the output queue is "throttled" using two different criteria. In particular, if the RIP process is more than a predetermined number of pages (the page count limit) ahead of the output device, the process will idle until some of the rasterized pages are output to the output device, in order to prevent any possibility of overflowing the output queue. In addition, a determination is made as to whether space is available in the output queue to hold the next raster image file. If not, the process idles until there is enough space for the estimated raster image file size.

In the event that the pointer is not pointing to a priority job, as determined at box 76, the routine proceeds to box 78 which determines whether the configuration of the output device is correct for the current job. If so, the routine proceeds to box 86 and the current job is ultimately rasterized in the manner described above. Otherwise, the pointer is incremented at box 80 and the routine proceeds back to box 74 so that the next job in the RIP queue for which the current output configuration is correct can be located and rasterized.

In the event that there are no remaining jobs in the queue for the current output configuration, the pointer will be beyond the end of the queue and a determination will be made at box 92 as to whether or not the queue is empty. If the queue is empty, then the pointer will be reset at box 72 and the routine will loop between boxes 72, 74 and 92 until a new graphic image file is introduced into the queue. If the queue is not empty after all jobs for the current output configuration have been processed, then a determination is made at box 94 as to whether the system operator has been notified that the configuration must be changed. If the operator has not yet been notified to implement a configuration change, the operator will be instructed to change the output configuration as indicated at box 96. The routine will then continue to process all jobs for the new configuration. In this manner, all jobs in the queue will ultimately be processed with the correct output configuration for the job. Further, any priority jobs will be immediately accommodated.

As is clear from the flowchart of FIG. 4, the selectors in each of the output device control modules 40 will select files from the RIP queue using parameters from the RIP queue, from the output queue, and from the output device. For example, the RIP queue identifies which (if any) of the files stored therein are priority files, the volume of data in the graphic image files or an estimate of the volume of data that will be present in the raster image files generated from the graphic image files, and what output configuration each file requires. The output queue keeps the selector advised as to the space available for new raster image files. The output device keeps the selector advised of its current configuration. With all of this information (as well as additional information that may be input by a user), the selector can make intelligent choices as to the order in which the files in the RIP queue should be processed for efficient throughput.

Figure 5:
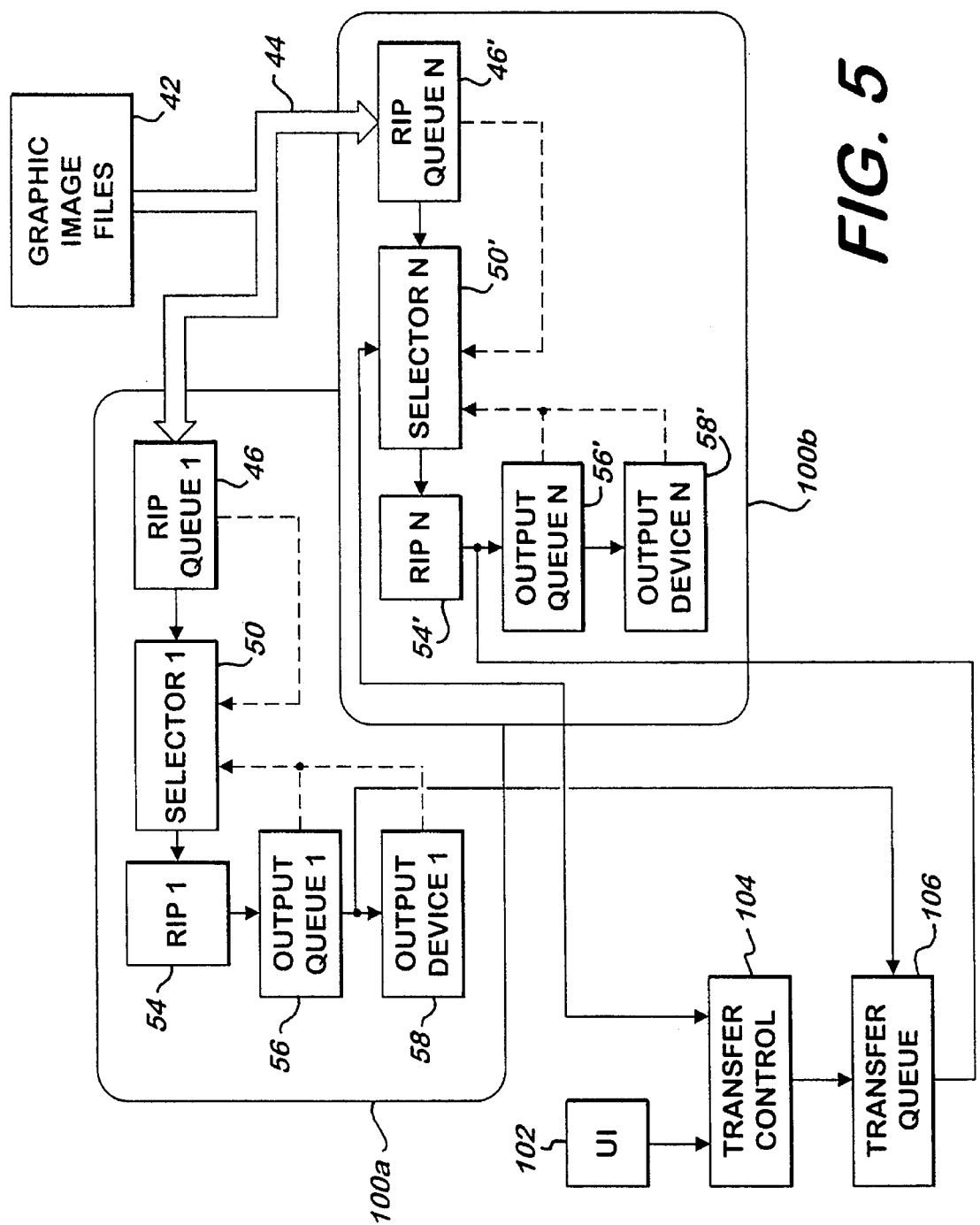
FIG. 5 is a block diagram of an embodiment of the invention in which raster image data can be transferred between different output queues.

FIG. 5 illustrates an embodiment of the invention in which raster image data can be transferred from the output queue of one output device control module 100a to the output queue of another output device control module 100b. This is especially useful in the situation where it is desired to preview a rasterized image on the output device 58 (e.g., a graphic display monitor) of module 100a prior to committing to the expense of recording the image on the output device 58' (e.g., an image recorder, laser printer, or the like) of module 100b. Since the rasterizing of the image may be quite time consuming, it would wasteful of both time and computer resources to rasterize the image once to preview it on a monitor and again to record it on a medium such as photographic film. Therefore, the embodiment of FIG. 5 allows the rasterized image to be previewed on a display monitor provided as the output device in control module 100a, and then exported to control module 100b for recordal without the need to rasterize the image data again.

In order to accomplish rasterized file transfer, a user interface (UI) 102 is provided to enable the user to actuate a transfer controller 104 to transfer a rasterized file from output queue 56 of module 100a to a transfer queue 106. At the same time, the transfer controller advises the selector 50' of module 100b that a rasterized image file is to be loaded from transfer queue 106 into output queue 56'. The selector will advise transfer controller 104 when space is available in output queue 56' for the raster data to be transferred, and the transfer controller 104 will then transfer the raster image data from transfer queue 106 to output queue 56'. The raster image data will then be recorded (or otherwise processed) by output device 58' of module 100b in sequence.

Figure 6:
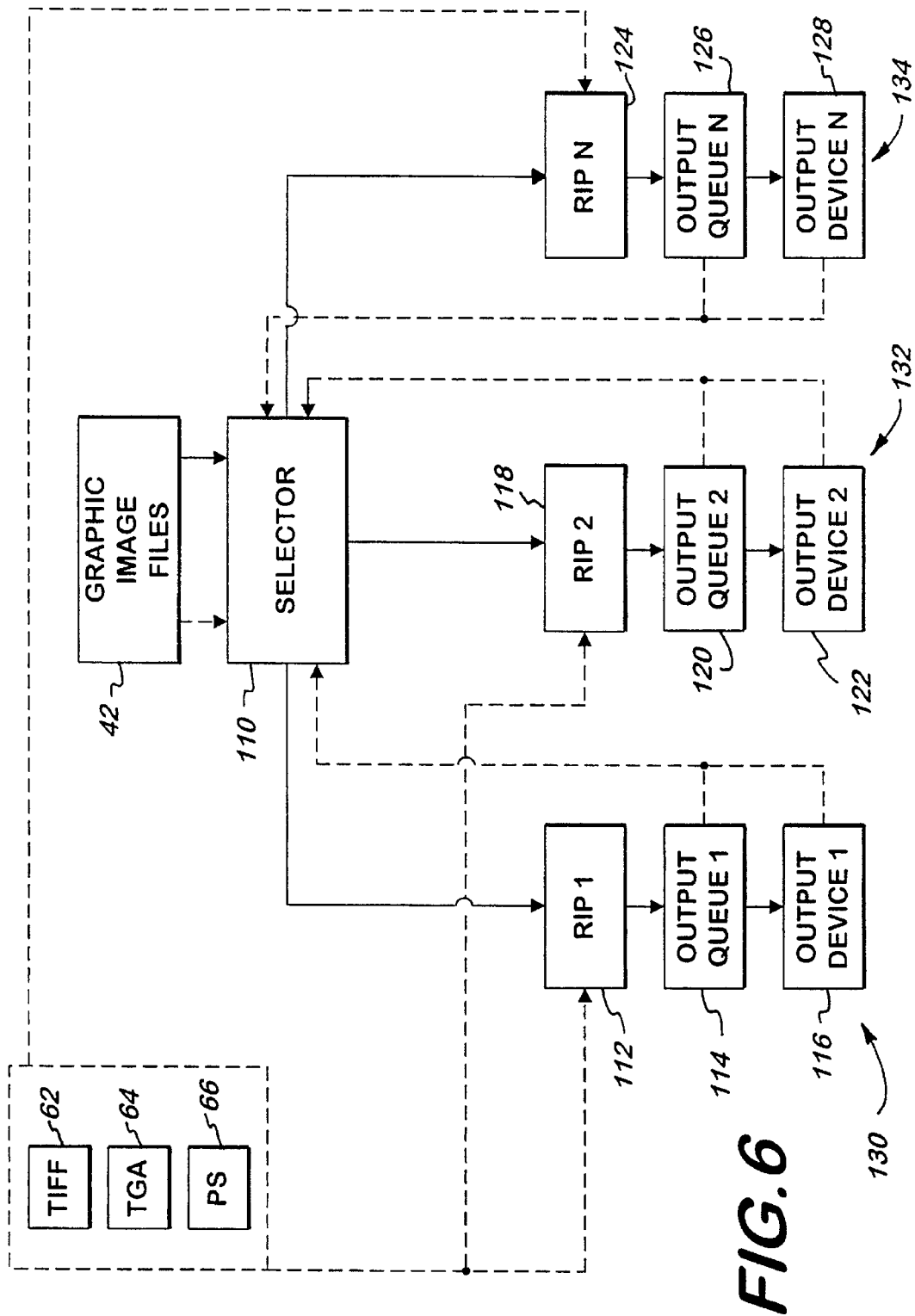
FIG. 6 is a block diagram of an alternate embodiment of the invention in which different graphic images contained in a graphic image file are concurrently processed by different output devices.

In another embodiment of the present invention as depicted in FIG. 6, a single selector 110 manages a plurality of output device control modules for the concurrent (i.e., "parallel") processing of different images contained in a graphic image file. The selector 110 is similar to the selectors 50 described above and monitors the parameters of the graphic image files 42, the output queues 114, 120 and 126 and the output devices 116, 122, and 128 of the various control modules generally designated 130, 132 and 134.

Selector 110 determines which of the RIPs 112, 118, and 124 should process particular image data contained in a graphic image file with the greatest efficiency based on the space available in each of the output queues 114, 118, and 126. After determining the proper output device, the raster image data are transferred to the appropriate control module 130, 132 or 134 for processing.

It should now be appreciated that the present invention provides a scheme for managing the rasterization of graphic image files. Different imaging jobs are placed into particular queuing systems depending upon an output device specified by the job. Once a job enters a RIP queue, a selector or "job controller" starts to track the job and ensure that it efficiently moves through the system. Parameters associated with a job are used to determine if the required output device is on line and if the output device has the proper configuration. For example, a job may require that an image recorder be on line. If a laser printer is on line instead, the job is held due to the mismatch.

The job controller maintains at least a two stage queuing system for each output device. The first stage, known as the RIP queue, holds jobs waiting to be rasterized. Rasterized pages are held in a second queue called the output or device queue. This two stage structure allows the processing and imaging of files to proceed in an overlapped fashion with the RIP typically several pages ahead of the imaging device. By maintaining several pages in the output queue, this queue serves as a buffer to balance the varying process times for complex and simple images against an output device that prints at a relatively constant rate. The proper output order for the various pages of each job is preserved by the output device driver pulling pages out of the second queue in the proper order.

The job controller supervises this multi-processing activity and maintains the queues and jobs associated with each output device. When a job is ready to be processed, the job controller starts the appropriate RIP. The RIP will then report back when it is finished with that job. The job controller also takes care of deleting intermediate files when a job leaves the system. Completed jobs can be tracked, and a list of completed jobs can be viewed by a user.

Individual RIP and output queues for each output device can be blocked by the user or by the system. Typically, the system will block a device's output queue when the condition of the device (such as the camera being out of film, a paper jam, or the device being off line) prevents further imaging.

When a job in a RIP queue is ready to be processed, the job controller starts the RIP module specified in the job control file. This RIP module is used to process the files for the job and generates rasterized pages which are stored in an intermediate storage area. The RIP notifies the job controller when each page is ready to be added to the output queue.

Although the invention has been described in connection with several specific embodiments thereof, it will be appreciated by those skilled in the art that numerous modifications and adaptations may be made thereto without departing from the spirit and scope of the invention as set forth the following claims.

What is claimed is:

1. Apparatus for managing a plurality of output devices to generate images from graphic image files, said apparatus being associated with a host system and wherein each of said output devices is associated with a respective control system, said control systems comprising:

a first queue for storing graphic image files to be processed by the associated output device;

said graphic image files stored in said first queue containing data for different images in a first order;

means for rasterizing image data from the graphic image files stored in said first queue to provide raster image data for a plurality of images;

a second queue for storing the raster image data generated by said rasterizing means; and means for selecting said image data from the graphic image files stored in said first queue on a real-time basis for processing by said rasterizing means, said selecting means being responsive to parameters of said graphic image files and the associated output device to manage the flow of image data from said first queue to said rasterizing means and from said rasterizing means to said associated output device via said second queue;

such that said rasterizer means can process additional image data from the graphic image files stored in said first queue even while said associated output device cannot receive additional data from said second queue.

2. The apparatus of claim 1 wherein said selecting means are also responsive to parameters of said second queue.

3. The apparatus of claim 2 wherein:

the data defining each image have an associated volume; and said selecting means optimize the storing of said raster image data in said second queue by selecting image data from said first queue for processing by said rasterizing means in a second order based on said associated volumes.

4. The apparatus of claim 3 wherein said parameters of said second queue are indicative of how much storage space is available in said second queue to receive raster image data.

5. The apparatus of claim 2 wherein said parameters of said second queue are indicative of how many different images are currently stored in said second queue for transfer to its associated output device.

6. The apparatus of claim 1 wherein said selecting means in each of said control systems of said apparatus is also responsive to parameters of said host system.

7. The apparatus of claim 6 wherein said parameters of said host system are indicative of the current availability of at least one host system resource required to support the operation of said control systems.

8. The apparatus of claim 1 further comprising transfer control means responsive to a user input for transferring rasterized image data received from the second queue of a first control system associated with a first output device to the second queue of a second control system associated with a second output device.

9. The apparatus of claim 1 wherein said rasterizing means comprise means for accessing any selected one of a plurality of different raster image processor modules provided by said host system, such that said rasterizing means in said control systems can rasterize data according to said selected one of said plurality of different modules.

10. The apparatus of claim 9 wherein a plurality of said control systems may access the same or different ones of said modules concurrently.

11. The apparatus of claim 9 wherein said plurality of modules include at least one of a TIFF, Targa or PostScript raster image processor.

12. The apparatus of claim 9 wherein said graphic image files include parameters specifying the module(s) to be used to process the image data contained therein.

13. The apparatus of claim 1, wherein:

at least one of said output devices comprises a photographic image recorder; and said parameters of the image recorder output device are indicative of at least one of a film type, a film status, and an installed camera module identification.

14. The apparatus of claim 1, wherein said graphic image files are at least one of bitmap files and text files.

15. The apparatus of claim 1, wherein said output devices include a graphic display monitor and an image recorder.

16. The apparatus of claim 1, wherein said selecting means are also responsive to user input.

17. Apparatus in accordance with claim 1 wherein said means for rasterizing image data include a plurality of raster image processors for concurrently rasterizing a plurality of pages of image data to be stored in said second queue.

18. Apparatus in accordance with claim 17 wherein each of said plurality of raster image processors is substantially identical.

19. A method for managing each of a plurality of different output devices to generate selected images from graphic image files served from a host system, comprising the steps of:

storing graphic image files to be processed by an output device in a first queue associated with that output device;

said graphic image files stored in said first queue containing data for different images in a first order;

rasterizing image data from the graphic image files stored in said first queue to provide raster image data for a plurality of images;

storing the raster image data generated during said rasterizing step in a second queue associated with the output device; and selecting said image data from the graphic image files stored in said first queue on a real-time basis for rasterizing, said selecting step being performed in response to parameters of said graphic image files and the associated output device to manage the flow of image data from said first queue to said output device via said second queue;

such that said rasterizer means can process additional image data from the graphic image files stored in said first queue even while said associated output device cannot receive additional data from said second queue.

20. Apparatus for managing a plurality of output devices to concurrently process a plurality of different images contained in a graphic image file, comprising:

means responsive to parameters of said graphic image file for selecting different image data from said graphic image file for processing by different ones of said output devices;

means for storing the image data selected for each output device in a first queue associated with that output device;

means for rasterizing the image data from the first queue for each output device to provide raster image data for the output device in response to at least one parameter of that output device;

means for storing the raster image data for each output device in a second queue associated with that output device; and means for transferring the stored raster image data to the associated output device for the generation of an image;

wherein said rasterizer means can process additional image data from the graphic image files stored in said first queues even while said associated output devices cannot receive additional data from said second queues.

21. Apparatus in accordance with claim 20 wherein:

said graphic image file is served by a host system; and said selecting and rasterizing means are also responsive to said host system for selecting and rasterizing said image data.

22. Apparatus in accordance with claim 20 wherein said selecting means are also responsive to parameters of the second queues associated with said output devices for selecting said image data.

23. Apparatus in accordance with claim 22 wherein:

said parameters of said graphic image file to which said selecting means are responsive are indicative of the amount of data associated with different images represented by said graphic image file; and said parameters of the second queues to which said selecting means are responsive are indicative of the amount of space available in said second queues for storing rasterized image data.

24. Apparatus in accordance with claim 23 wherein:

said output devices comprise film recorders; and said parameters of said output devices to which said rasterizing means are responsive are indicative of at least one of a film type, a film status, and an installed camera module identification.

25. Apparatus in accordance with claim 23 wherein said amount of data to which said selecting means are responsive is an estimate of the amount of rasterized data that will result when a corresponding image is rasterized.

26. Apparatus for managing a plurality of output devices to generate images from graphic image files, said apparatus being associated with a host system and wherein each of said output devices is associated with a respective control system, said control systems comprising:

a first queue for storing graphic image files to be processed by the associated output device;

said graphic image files stored in said first queue containing data for different images in a first order;

means for rasterizing image data from the graphic image files stored in said first queue to provide raster image data for a plurality of images;

a second queue for storing the raster image data generated by said rasterizing means; and means for selecting said image data from the graphic image files stored in said first queue on a real-time basis for processing by said rasterizing means, said selecting means being responsive to parameters of said graphic image files and the associated output device to manage the flow of image data from said first queue to said rasterizing means and from said rasterizing means to said associated output device via said second queue; wherein:

said parameters of said graphic image file to which said selecting means are responsive are indicative of the amount of data associated with different images represented by said graphic image files; and said rasterizer means can process additional image data from the graphic image files stored in said first queue even while said associated output device cannot receive additional data from said second queue.

27. Apparatus in accordance with claim 26 wherein said amount of data to which said selecting means are responsive is an estimate of the amount of rasterized data that will result when a corresponding image is rasterized.

* * * * *